United States Patent [19] [11] 4,035,518
Carmona et al. [45] July 12, 1977

[54] METHOD FOR OBTAINING AFLATOXIN-FREE FOOD PRODUCTS

[76] Inventors: Julian Y. Carmona, 279 Guevara Avenue, San Juan, Rizal; Marcelo P. Marasigan, 6-Legaspi Street, Philamlife Homes, Quezon City, both of Philippines

[21] Appl. No.: 619,763

[22] Filed: Oct. 6, 1975

[30] Foreign Application Priority Data

Jan. 15, 1975 Philippines ............................ 16720

[51] Int. Cl.$^2$ ......................................... A01K 43/00
[52] U.S. Cl. ................................ 426/231; 426/267; 426/270; 426/629; 426/632; 426/633; 426/507
[58] Field of Search .......... 426/270, 632, 633, 629, 426/321, 322, 267, 507, 231

[56] References Cited

U.S. PATENT DOCUMENTS

| | | | |
|---|---|---|---|
| 1,476,649 | 12/1923 | Schad | 426/633 |
| 3,084,046 | 4/1963 | Johnson et al. | 426/630 |
| 3,453,117 | 7/1969 | Swisher | 426/270 |
| 3,585,041 | 6/1971 | Mann et al. | 426/630 |
| 3,890,452 | 6/1975 | Brandt et al. | 426/632 |

*Primary Examiner*—Raymond N. Jones
*Assistant Examiner*—C. A. Fan

[57] ABSTRACT

A method for obtaining food products substantially free of aflatoxin in the form of particles, kernels, and the like, is disclosed wherein a food product such as whole grain seeds or whole kernel nuts are subjected to a weakly alkaline aqueous solution maintained at elevated temperatures for a short period of time, washing the thusly treated food product with water until the wash effluent indicates that it is pH neutral and separating the aflatoxin-contaminated food product from the uncontaminated food product. The uncontaminated food product sources can then be further processed to obtain a food product ready for consumption.

30 Claims, No Drawings

METHOD FOR OBTAINING AFLATOXIN-FREE FOOD PRODUCTS

This invention relates to a method for separating aflatoxin contaminated kernels, seeds, nuts, and the like, from uncontaminated whole grain seeds, whole or split kernels nuts, and the like, to obtain an uncontaminated supply source for a food product.

BACKGROUND OF THE INVENTION

Aflatoxin is produced by the action of a fungi belonging to the genus, Asperigillus, on exposed grain seeds or nuts. Aflatoxin affects certain grains such as corn, hops, cottonseed, soybean, and the like, as well as such nuts as almonds, Brazil nuts, pecans, pistachios, peanuts, and the like, and is particularly active and dominant when such grains and nuts are grown and cultivated in wet climates.

Due to the toxic threat that aflatoxin-contaminated food sources present to animals, there have been many attempts to treat grains and nuts in meal form so as to either detoxify these food sources or lower the level of their aflatoxin-contamination. Representative of such attempts are the use of photochemical means to detoxify the aflatoxin-contaminated food sources (U.S. Pat. No. 3,506,452), mixing the food source product with methylamine at elevated temperatures (U.S. Pat. No. 3,585,041), contacting the food source product with ozone (U.S. Pat. No. 3,592,641), treating suspension of the food product with peroxide (British Pat. No. 1,117,573), treating the food products with various aromatic solvents such as aqueous isopropanol (E. T. Raynor et al., *J. Amer. Oil. Chem. Soc.*, 1968, 45 (9) pp. 622-4), aqueous ethanol (E. T. Raynor et al., *J. Amer. Oil Chem. Soc.*, 1970, 47 (1), 26 *Chem. Abstracts*, 72:6847z), an actone-hexane-water-azeotrope mixture (U.S. Pat. No. 3,515,736), and aqueous acetone followed by hexane extraction (U.S. Pat. No. 3,557,168).

Treatment of aflatoxin-contaminated food source products with strong alkaline based solutions at elevated temperatures for extended periods of time has also been attempted. One such method involves treating hydrated peanut meal in the presence of either ammonia or methylamine or sodium hydroxide or ozone to reduce the aflatoxin content to less than about thrity parts per billion (ppb) followed by extraction of the peanut meal with 90% acetone-10% water to produce a peanut meal free of aflatoxin (F. G. Dollear et al, "Elimination of Aflatoxins from Peanut Meal", *J. Amer. Oil Chem. Soc.*, 45 (12), pp. 862-5 (1968), *Chem. Abstracts*, 70:76557 (1969)). In another effort, afflatoxin in peanut meal was reduced by contacting the peanut meal with either ammonia or methyl ammonia or sodium hydroxide or bicarbonate (G. E. Mann et al, "Chemical Inactivation of Aflatoxin in Peanut and Cottonseed Meals", *J. Amer. Oil. Chem. Soc.*, 45 (5) pp. 173-61 (1970), *Chem. Abstracts*, 73:23929 (1970)). Still another attempt involves innoculating a growth media with a commercial bleach such as Clorox containing sodium hyperchlorite at various concentrations (C. Y. Young, "Comparative Studies on the Detoxification of Aflatoxins by Sodium Hypochlorite and Commercial Bleaches", *Appl. Microbiol.*, 24 (6) pp. 885-90 (1972), *Chem. Abstracts*, 78:80617 (1973)). More recently, aflatoxin contaminated oilseed meal products have been treated with a mixture of an alkali or alkaline earth metal and an organic amine (U.S. Pat. No. 3,890,452).

One method of particular interest involves cooking peanut meal in a two percent solution of sodium hydroxide for two hours at a temperature of 100° C in order to reduce the aflatoxin content to 18 ug/kg. When the peanut meal was cooked for 1.5 hours at 212° F, the aflatoxin was reduced to 9 ug/kg. (F. G. Dollear, "Detoxification of Aflatoxins in Foods and Feeds", *Sci. Bkgrnd. Cntrl. & Imp.*, edited by L. A. Goldblatt, Academic Press, N.Y. (1969) pp. 359–91, *Chem. Abstracts*, 76:68783 (1972)).

It is significant to note that the prior art methods and processes referred to and described above all attempt to provide means for complete detoxification and use grains or nuts which have been ground to meal form. It will also be noted that these prior art methods involve prolonged, sometimes complex and often costly procedures, especially where the grains or nuts must be defatted and then ground to meal form before being subjected to these processes.

It would be desirable, therefore, to provide a simple, easy and economical means for substantially eliminating aflatoxin-contaminated grain seeds or nuts from uncontaminated grain seeds or nuts thereby permitting these uncontaminated grain seeds or nuts to be safely used as a source supply for food products.

THE INVENTION

The process of this invention generally comprises contacting a food source product such as whole grain seeds, whole or split kernel nuts, and the like, with an aqueous solution containing a water-soluble, food-compatible aflatoxin agent at elevated temperatures for a short period of time, washing the thusly contacted food source supply with water to remove the aflatoxin agent therefrom; and, separating the aflatoxin-contaminated seeds or nuts from the uncontaminated seeds or nuts. The term "aflatoxin agent" is intended to refer to and should be understood as referring to those chemical substances that are capable of attacking aflatoxin in such a manner as to cause a sharp, almost immediate and visual change in color or the food particle contaminated with aflatoxin. As indicated, the aflatoxin agent must also be water-soluble and compatible with the food particles to be treated. Among the chemicals useful as aflatoxin agents, alkalis are preferred.

Due to the nature of the alkaline solution used and the number of washing that the seeds or nuts are subjected to, there is a tendency for these materials to absorb water and thereby increase their moisture content. However, the moisture level in the separated, uncontaminated seeds or nuts can readily be reduced by subjecting them to heat such as, for example, passing them through an oven before subjecting them to further processing.

It is important to note that there is a significant distinction between the process of this invention utilizing whole grain seeds, whole or split nut kernels and similar types of particulate food products and the prior art processed which involve treating grains or nuts in defatted, meal form. The particle size of the grains or nuts subjected to treatment is important as particle size is related to and is a direct function of the capability of the process to detoxify the food source supplies in the first instance and then remove from them the aflatoxin agent used; in this case, alkali. Due to the differences in particle sizes between a meal and whole or split grains or nut kernels, the aflatoxin agent, e.g., alkali, can be more quickly and readily removed with fewer washings from the larger particles, i.e., the whole or split grain seeds or kernel nuts.

On the other hand, it is believed that detoxification can be more readily and completely achieved with food products of small particle size such as those provided in meal form than with food products of large particle size such as whole or split grains and nuts. The reason for this appears to reside in the fact that the lactone ring of aflatoxin is opened when contracted by the aflatoxin agent, thus altering the aflatoxin compound and rendering the aflatoxin water soluble. However, it is known that this open lactone ring structure can be closed if it is subjected to acidic conditions. Consequently, the opened lactone ring could become closed and the aflatoxin reactivated when the treated food product is ingested by an animal and subjected to the acidic conditions present in the stomach. This tendency is believed to be substantially reduced and, indeed, completely eliminated when food products of small particle size, e.g., meals, are subjected to the detoxification processes represented by the prior art referred to and discussed hereinabove.

These same factors, however, are not applicable to food products of relatively larger size such as whole or split grain seeds or kernel nuts. The relative size and density of these larger particles renders it difficult, if not impossible, for the detoxifying agent to reach and with all of the aflatoxin present in the larger particles. Hence, the process of this invention is not so much concerned with detoxification as represented by the prior art, but with providing a simple, easy, efficient and effective means for separating aflatoxin-contaminated food products from uncontaminated food products.

The process of this invention is particularly adaptable to whole and/or split peanuts and, since peanuts are a worldwide staple food source supplied in a variety of forms such as whole kernel, meal, extracted whole oil and oil fractions, the ensuing description of the inventive process is set forth with reference to its applicablity for obtaining aflatoxin-free peanuts. It should be understood, however, that selection of peanuts as the food source is intended only for the purpose of illustrating an exemplifying the inventive process and is not intended to be limitative thereof as the process is equally adaptable for use with other types of nuts as well as various grain seeds.

To prepare a batch of peanuts that are to be treated by the process of the invention, the shells are first removed and the whole and/or split peanut kernels with their skins attached are placed in an alkali bath. The amount of nuts supplied to the bath is not critical but should not be so great that the nut kernels are crammed in the bath in such a way as to prevent their entire surface area from being exposed to the bath solution. Generally, it has been found that good results are obtained when amounts based on a kilogram (kg.): gallon (gal.) ratio of nuts: bath solution of about 1:1 is used, e.g., 100 kg. peanuts: 100 gals. of bath solution.

As mentioned earlier, the preferred aflatoxin agent used in the process of the invention is an alkali which is dissolved in water to produce a weakly alkaline bath solution on the order of about 0.05–0.75% alkali, preferably 0.1–0.4%. The alkaline bath solution can be readily prepared by dissolving in water an amount of alkali sufficient to obtain the desired alkaline concentration. The alkalis that can be used are such metal alkali hydroxides are potassium hydroxides, sodium hydroxide, calcium hydroxide, and the like, sodium hydroxide being preferred.

During treatment, the alkali bath solution is maintained at a temperature of about 180°–213° F, preferably about 210°–212° F, for a period of about 5–15 minutes, preferably about 8–12 minutes. After treatment in the alkaline bath solution, the peanuts are removed from the bath and transferred to a water trough where they are washed with water until the wash effluent indicates that it is pH neutral. During washing, the peanut skins become loosened, separate from the peanut kernels, and float to the surface of the wash water. Using conventional means, these skins are separated and removed from the wash water.

Alternatively, the wash water can also contain a mild acid to obtain a pH neutral wash effluent more quickly. In either instance, it is important that the treated peanuts be washed sufficiently to remove all traces of alkali and/or acid.

During washing, the peanuts, in addition to being blanched, undergo an immediate and dramatic color change of the flatoxin-contaminated peanuts as opposed to the uncontaminated peanuts. The aflatoxin-contaminated peanuts suddenly turn a deep dark brown color as constrasted with the uncontaminated peanuts which demonstrate little or no color change and remain almost white. While it is not completely understood, it is believed that this dramatic and immediate color change results from the reaction of the hot alkali with either the aflatoxin-damaged peanut tissue, the mold itself and/or the metabolites produced by the mold. Other kernel defects resulting from insect contamination, various fungi, physiological defects and trace element deficiencies may also "blossom" due to the alkali treatment. It is this distinctive color change that permits complete and efficient separation of the aflatoxin-contaminated peanuts from the uncontaminated peanuts.

After the washing has been competed, the blanched peanuts are transferred to a sorting area where the discolored, aflatoxin-contaminated peanuts are separated from the lighter colored, uncontaminated peanuts. Even those kernels exhibiting small, localized discoloration spots are removed. Conveniently, the washed peanuts can be transported by such means as a conveyer belt past a sorting or separating area or a point where any suitable means can be employed to separate the uncontaminated peanuts from the aflatoxin-contaminated peanuts. Since the distinctive, contrasting colors between the aflatoxin-contaminated peanuts and the uncontaminated peanuts is to pronounced as to be almost equivalent to a "black-white" condition, sorting and separating of the aflatoxin-contaminated peanuts from the uncontaminated peanuts can be readily accomplished by such means as an electronic sorter. However, where such advanced mechanical sorting and separating means as electronic sorters are not available, accurate, complete and efficient sorting and separation can still be accomplished by any other available and suitable means, even by hand, if necessary.

The sorted and separated aflatoxin-contaminated peanuts are discarded while the uncontaminated peanuts can then be further processed to obtain a food product such as peanut butter. However, since the nuts have a tendency to absorb moisture during their treatment and may contain as much as 25-30% by weight moisture, it may be desirable to reduce this moisture content such as by passing the uncontaminated peanuts through a drying oven before they are sent on for further processing. Alternatively, the moisture-containing peanuts can be directly processed on conventional oil roasting apparatus. For example, the moisture-containing peanuts can be placed in an oil bath maintained at a temperature of about 235°-340° F for a period of about 15-30 minutes in order to concurrently dry and roast the peanuts. When the peanuts are pre-dried, the time in the oil bath can be reduced to about 10-20 minutes.

Thus, uncontaminated peanuts can be quickly and efficiently obtained from a source supply of peanuts containing aflatoxin-contaminated peanuts in amounts as much as 600-2500 ppb. (ug/kg.) aflatoxin after subjecting the source supply of peanuts to the process of the invention and removing the aflatoxin-contaminated peanuts therefrom. The uncontaminated peanuts can then be used to make a food product such as peanut butter containing substantially less than 30 ppb. alfatoxin, an amount well within the maximum level that has been established to be safe for human and animal consumption, and frequently the aflatoxin level can be reduced to as low as 1 ppb.

The process of the invention will become more clear from a consideration of the following examples which are set forth to further illustrate the process of the invention and are not intended, in any way, to be limitative thereof.

EXAMPLE I

Separation of Aflatoxin-Contaminated Peanuts

Thirty kg. of shelled, unblanched split peanut kernels were placed in 30 gallons of a 0.10% sodium hydroxide solution which was at a temperature of 212° F and held in the solution at this temperature for a period of 10 minutes. At the end of this time, the peanuts were removed from the solution and transferred to a shallow tank where they were washed with water until the wash effluent was pH neutral to litmus. In this instance, five rapid water washings were necessary to obtain a neutral pH in the wash effluent. During washing, the skins became loosened and separated from the peanuts whereupon they floated to the surface of the wash water and were removed. At this time, the total peanut batch contained light colored uncontaminated peanuts and dark colored, aflatoxin-contaminated peanuts which were clearly and readily apparent by visual inspection. Next, the washed peanuts were processed through a separating and sorting point where the dark colored, aflatoxin-contaminated peanuts were separated and removed from the light colored, uncontaminated peanuts. Analysis of the uncontaminated peanuts revealed that they contained 30% moisture at this time.

EXAMPLE II

Treating, Roasting and Milling Peanuts Obtained From a Batch of Aflatoxin-Contaminated Peanuts Eighteen kg. of randomly selected, split Spanish peanuts containing 30 ppb. aflatoxin were placed in a heating kettle equipped with a steam jacket. Eighteen gals, of distilled water were added to the kettle and the water brought to a temperature of 212° F. At this point, 0.3 lb. NaOH as a concentrated caustic solution was added to the kettle to produce a 0.2% NaOH solution. The peanuts were maintained in the heated kettle for a period of 10 minutes after which they were removed from the kettle and rinsed five consecutive times with tap water, i.e., until the wash effluent was pH neutral to litmus. Following the rinsing process, the peanuts were manually blanched and manually inspected whereupon the dark colored aflatoxin-contaminated peanuts were separated and removed from the light colored, uncontaminated peanuts.

The dark colored, aflatoxin-contaminated peanuts were ground and blended and retained for aflatoxin evaluation while the light colored, uncontaminated peanuts were divided into two groups. One group of the uncontaminated raw peanuts was milled by conventional milling, thoroughly blended and then analyzed for aflatoxin content. The other group of uncontaminated peanuts was roasted for 12 minutes in a peanut oil bath maintained at a temperature of 300° F whereupon these peanuts were also milled in a conventional manner. Following milling of the roasted peanuts, the sample was thoroughly blended and also analyzed for aflatoxin content. Aflatoxin analysis was obtained pursuant to AOAC method No. 3 (Assn. of Anal. Chem., (1970), 11, page 429).

The results of the analyses for aflatoxin are set forth in Table 1 below:

TABLE 1

Aflatoxin Results on Samples of Raw Treated Peanuts and Different Fractions (Raw & Roasted) Tested for Aflatoxin Content After Removal of Discolored Kernels

| Sample Description | Total Aflatoxin (ug/kg) |
|---|---|
| *Raw, Untreated Nuts | 30 |
| **Raw, Treated, Dark Colored, Rejected Nuts | 309 |
| *Raw, treated, Light Colored, Acceptable Nuts | <4 |
| *Roasted, Treated, Light Colored Acceptable Nuts | <4 |

*Sample weight = 1200 grams
**Sample weight = 62.9 grams

As can be seen from the results set forth in Table 1 above, the level of aflatoxin in both of the treated groups of nuts was quite low, even after being milled or milled and then roasted.

EXAMPLE III

Preparation of Peanut Butter From a Batch of Peanuts Containing Aflatoxin-Contaminated Peanuts The same procedures were used as in Example I above to obtain light colored, uncontaminated and blanched peanuts having a moisture content of about 30%.

These peanuts were then placed in an oil bath comprising a mixture of peanut oil and corn oil, the ratio of peanut oil: corn oil being about 30:70 on a volume basis. The oil bath was maintained at a temperature of about 285° F and the peanuts were kept in the oil bath for a period of about 20 minutes whereupon they were removed from the oil bath then milled and ground using conventional milling apparatus.

A sample of the peanuts was taken after exposure to the hot oil bath and before milling and grinding. These sample peanuts were treated for roast thoroughness and moisture content and were found to be completely roasted and dried to a moisture content of about 2.0% by weight.

To the particulate peanuts there were added flavoring agents comprising salt in an amount of about 1.5% by weight and sugars in the form of dextrose and sucrose totalling 5.0% by weight. These ingredients plus the peanut oil obtained from the initial milling and grinding step were then blended together and the entire blend again milled and ground to obtain a creamy peanut butter.

The peanut butter product obtained was tested for its organoleptic properties and was found to be comparable in odor, texture, mouthability, spreadability, and the like, to conventional, commercially obtained peanut butter products and had an acceptable toasted, nutty flavor.

The peanut butter product was also tested for aflatoxin pursuant to the AOAC method identified in Example II above and was found to have less than 4 ppb. aflatoxin which, to all extents and purposes, was equivalent to a finding of no aflatoxin under this method.

Example IV

Preparation of Peanut Butter From a Batch of Peanuts Containing Aflatoxin-Contaminated Peanuts The same procedures were followed as in Example III above except that the separated and blanched peanuts were first passed through a drying oven maintained at a temperature of about 175° F in order to dry the peanuts to a moisture content of about 2.5% by weight. The dried peanuts were then roasted in an oil bath as in Example III above except that the temperature of the oil bath was at about 212° F and the peanuts were kept in the oil bath for only 10 minutes.

After milling, grinding and blending as in Example III, a peanut butter product was obtained that had organoleptic properties comparable to conventional, commercially obtained peanut butter products and, using the AOAC test method, was found to be completely free of aflatoxin.

It will be apparent to those skilled in the art that preceding Examples III and IV are illustrative of well known methods used to obtain conventional peanut butter products. Accordingly, these methods can be modified as known to the skilled artisan.

For example, where the separated and blanched peanuts are roasted and concurrently dried in the hot oil bath as in Example III, the bath temperature can be as high as about 340° F and the peanuts can be maintained in the oil bath for about 15-30 minutes. On the other hand, where the peanuts are dried before being roasted in the hot oil bath, the oil bath temperature range can be about 235°-275° F and the peanuts need be retained in the oil bath a period of only about 10-15 minutes. In either instance, the moisture content of the peanuts is reduced to the generally acceptable range of about 1-3%.

Similarly, other oils in addition to or in place of corn oil and/or peanut oil can be used for the oil bath such as coconut oil, palm kernel oil, cottonseed oil, palm oils, and the like, as well as mixtures thereof.

In addition, and as is also known to the skilled artisan, a relatively high melting fat component, that is, a fat having a melting point higher than 110° F but lower than 160° F, can be added to the peanut butter product as a stabilizer to prevent or inhibit separation of the peanut oil from the product. For example, partially or completely hydrogenated fats or mixtures thereof such as mono- and di-glyceride esters of fatty acids can be used in small amounts of about 1-3% by weight, or when about equivalent amounts of peanut oil are removed, as high as about 5-10% by weight.

Organoleptic properties such as mouthability, color, flavor, odor, and the like, can also be adjusted or modified by known means which usually involve controlling the degree to which the nuts are roasted, adding or removing or adjusting the proportion of flavoring agents, i.e., salt and sugars, and the like.

Thus, while the invention has been described with particularity and in some detail, various changes and modifications can be made therein, as will become apparent to those skilled in the art, without departing from the scope and spirit of the invention.

What is claimed:

1. A method for separating a particulate food product from whole seed grains and whole or spit kernel nuts which is substantially free from aflatoxin comprising:

placing said particulate food product in an aqueous solution containing an alkaline, water-soluble, food compatible aflatoxin agent for a period of time sufficient for said aflatoxin-contaminated food particles to undergo a sharp, visually discernible change in color from almost white to deep dark brown, said aqueous solution being maintained at a temperature of about 180°-213° F;

removing said particulate food product from said aqueous solution; and, separating the aflatoxin-contaminated food particles from the uncontaminated food particles.

2. The method of claim 1 wherein said aflatoxin agent is an alkali selected from the group of metal alkali hydroxides consisting of potassium hydroxide, sodium hydroxide and calcium hydroxide, and said period of time is about 5-15 minutes.

3. The method of claim 2 wherein said alkali is present in said aqueous solution at a concentration of about 0.05-0.75% and said food product is water washed upon being removed from said aqueous solution until the wash effluent is pH neutral.

4. The method of claim 1 wherein the moisture content of the separated, uncontaminated food particles is reduced by drying said food particles at elevated temperatures before said food particles are subjected to further processing.

5. A method for separating a particulate food product from whole seed grains and whole or split kernel nuts which is substantially free from aflatoxin comprising:

placing said particulate food product in an aqueous solution containing an alkaline, water-soluble, food compatible aflatoxin agent for a period of about 5-15 minutes, said aqueous solution being at a temperature of about 180°-213° F, such that the aflatoxin-contaminated food particles undergo a sharp visually discernible change in color from almost white to deep dark brown;

removing said particulate food product from said aqueous solution and washing said food product until all of said aflatoxin agent has been removed therefrom; and, separating the aflatoxin-contaminated food particles from the uncontaminated food particles.

6. The method of claim 5 wherein said aflatoxin agent is an alkali selected from the group of metal alkali hydroxides consisting of potassium hydroxide, sodium hydroxide and calcium hydroxide.

7. The method of claim 6 wherein said alkali is sodium hydroxide present in said aqueous solution at a concentration of about 0.05–0.75% and said food product is washed until the wash effluent is pH neutral.

8. The method of claim 7 wherein said food product comprises peanut kernels, said alkali concentration is about 0.1–0.4%, said solution temperature is about 210°–212° F, said period of time is about 8–12 minutes and said sorting and separation is accomplished by means of an electronic sorter.

9. The method of claim 5 wherein the moisture content of the separated uncontaminated food particles is reduced by drying said uncontaminated food particles at elevated temperatures before subjecting them to further processing.

10. A method for separating a particulate food product from whole seed grains and whole or split kernel nuts which is substantially free from aflatoxin comprising:
placing said particulate food product in an alkaline aqueous solution maintained at a temperature of about 180°–213° F and containing an alkali at a concentration of about 0.05–0.75% for a period of about 5–15 minutes such that the aflatoxin-contaminated food particles undergo a sharp change in color from almost white to deep dark brown;
removing said particulate food product from said aqueous solution and water washing said food product until the wash effluent is about pH neutral; and,
separating the aflatoxin-contaminated food particles from the uncontaminated food particles.

11. The method of claim 10 wherein said alkali is selected from the group of metal alkali hydroxides consisting of potassium hydroxide, sodium hydroxide and calcium hydroxide.

12. The method of claim 11 wherein said food product comprises peanut kernels, said alkali concentration is about 0.1–0.4%, said solution temperature is about 210°–212° F, said period of time is about 8–12 minutes and said sorting and separation is accomplished by means of an electronic sorter.

13. The method of claim 10 wherein the moisture content of the separated uncontaminated food particles is reduced by drying said uncontaminated food particles at elevated temperatures before subjecting them to further processing.

14. A method for obtaining peanuts substantially free from aflatoxin comprising:
placing shelled whole or split peanut kernels in an aqueous alkaline solution maintained at a temperature of about 180°–213° F and containing alkali at a concentration of about 0.05–0.75% for a period of about 5–15 minutes such that the aflatoxin-contaminated peanuts turn dark in color;
removing said peanuts from said solution and washing said peanuts until the wash effluent is pH neutral, said peanuts being blanched during said washing; and,
separating the aflatoxin-contaminated peanuts from the uncontaminated peanuts.

15. The method of claim 14 wherein said alkali concentration is about 0.1–0.4%, said solution temperature is about 210°–212° F, said period of time is about 8–12 minutes and said separating is accomplished by means of an electronic sorter.

16. The method of claim 15 wherein said alkali concentration is about 0.2%, and said period of time is about 10 minutes.

17. The method of claim 14 wherein the moisture content of said sorted, uncontaminated peanuts is reduced to about 1–3% by weight by subjecting said moisture-containing uncontaminated peanuts to heat and drying them.

18. The method of claim 14 wherein said dried peanuts are placed in an oil bath maintained at a temperature of about 235°–340° F for a period of about 10–20 minutes in order to roast said peanuts.

19. The method of claim 18 wherein the oil bath is selected from the group consisting of peanut oil, corn oil, coconut oil, palm kernel oil, cottonseed oil, palm oils, and mixtures thereof, said temperature is about 285° F and said period of time is about 12 minutes.

20. The method of claim 14 wherein said sorted, uncontaminated peanuts are placed in an oil bath maintained at a temperature of about 235°–340° F for a period of about 15–30 minutes in order to concurrently dry and roast said peanuts.

21. The method of claim 20 wherein the oil in said oil bath is selected from the group consisting of peanut oil, corn oil, coconut oil, palm kernel oil, cottonseed oil, palm oils, and mixtures thereof, said temperature is about 285° F and said period of time is about 20 minutes.

22. A process for producing peanut butter from a batch of peanuts containing aflatoxin-contaminated peanuts comprising:
contacting said batch of shelled, whole or split peanuts with an alkaline, water-soluble, food compatible aflatoxin agent to effect a visually detectable color change from almost white to deep dark brown of those peanuts in said batch having aflatoxin contamination;
separating said color-changed, aflatoxin-contaminated peanuts from the uncontaminated peanuts;
comminuting said uncontaminated peanuts to obtain particulate peanuts; and,
roasting, milling and grinding said particulate peanuts to obtain a creamy peanut butter product.

23. A method for producing peanut butter from a batch of peanuts containing aflatoxin-contaminated peanuts comprising:
placing shelled whole or split peanut kernels in an aqueous alkaline solution maintained at a temperature of about 180°–213° F and containing alkali at a concentration of about 0.05–0.75% for a period of about 5–15 minutes such that the aflatoxin-contaminated peanuts turn dark in color;
removing said peanuts from said solution and washing said peanuts until the wash effluent is about pH neutral, said peanuts being blanched during said washing;
separating the dark colored, aflatoxin-contaminated peanuts from the uncontaminated peanuts;
placing said uncontaminated peanuts in an oil bath maintained at a temperature of about 235°–340° F for a period of about 15–30 minutes in order to concurrently dry and roast said uncontaminated peanuts;
milling and grinding said roasted peanuts to reduce the particle sized thereof and obtain a cream; and blending into said peanut cream flavoring agents selected from the group consisting of sugars and salts to obtain a creamy peanut butter product.

24. The method of claim 23 wherein a high melting fat compound as oil stabilizer is added to said cream during said blending.

25. The method of claim 23 wherein said alkali concentration is about 0.1–0.4%, said solution temperature is about 210°–212° F, said period of time is about 8–12 minutes and said separating is accomplished by means of an electronic sorter.

26. The method of claim 25 wherein said alkali concentration is about 0.2%, and said period of time is about 10 minutes.

27. The method of claim 23 wherein the oil in said oil bath is selected from the group consisting of peanut oil, corn oil, coconut oil, palm kernel oil, cottonseed oil, palm oils, and mixtures thereof, said temperature is about 285° F. and said period of time is about 20 minutes.

28. The method of claim 23 wherein the moisture content of said sorted, uncontaminated peanuts is reduced before said uncontaminated peanuts are placed in said oil bath by subjecting said uncontaminated, moisture-containing peanuts to heat and drying them to a moisture content of about 1–3% by weight.

29. The method of claim 28 wherein the oil in said oil bath is selected from the group consisting of peanut oil, corn oil, coconut oil, palm kernel oil, cottonseed oil, palm oils, and mixtures thereof, and said period of time is about 10–20 minutes.

30. The method of claim 29 wherein the temperature of said oil bath is about 285° F. and said period of time is about 12 minutes.

* * * * *

UNITED STATES PATENT AND TRADEMARK OFFICE
CERTIFICATE OF CORRECTION

PATENT NO. : 4035518

DATED : July 12, 1977

INVENTOR(S) : Julian Y. Carmona and Marcelo P. Marasigan

It is certified that error appears in the above-identified patent and that said Letters Patent are hereby corrected as shown below:

Column 1, line 65, "Bleashes" should read --Bleaches--.
Column 2, line 43, "or" should read "of"; line 61, "processed" should read --processes--. Column 3, line 30, before "with" insert --react--. Column 4, line 2, "are" should read --as--; line 24, "flatoxin" should read --aflatoxin--; line 41 "competed" should read --completed--; line 53, "to" should read --so--. Column 5, line 6, "on" should read --in--. Column 6, line 65, "treated" should read --tested--. Column 8, line 16, "spit" should read --split--.

Signed and Sealed this

Seventeenth Day of January 1978

[SEAL]

Attest:

RUTH C. MASON
Attesting Officer

LUTRELLE F. PARKER
Acting Commissioner of Patents and Trademarks